United States Patent [19]

Akashi et al.

[11] Patent Number: 4,914,282
[45] Date of Patent: Apr. 3, 1990

[54] FOCUS DETECTION SYSTEM EMPLOYING MULTIPLE AREA LIGHT DISTRIBUTION SENSORS

[75] Inventors: Akira Akashi; Akira Ishizaki; Akira Hiramatsu; Yasuo Suda, all of Yokohama; Keiji Ohtaka, Tokyo, all of Japan

[73] Assignee: Canon Kabushiki Kaisha, Tokyo, Japan

[21] Appl. No.: 294,920

[22] Filed: Jan. 9, 1989

Related U.S. Application Data

[63] Continuation of Ser. No. 750,283, Jul. 1, 1985, abandoned.

[30] Foreign Application Priority Data

Jul. 6, 1984 [JP] Japan ................................. 59-140196
Jul. 11, 1984 [JP] Japan ................................. 59-143722

[51] Int. Cl.$^4$ ................................................. G01J 1/20
[52] U.S. Cl. ................................. 250/201.8; 250/204
[58] Field of Search .................. 250/201 PF, 204; 354/406-409

[56] References Cited

U.S. PATENT DOCUMENTS

| | | | |
|---|---|---|---|
| 4,178,098 | 12/1979 | Asano et al. | 250/201 PF |
| 4,185,191 | 1/1980 | Stauffer | 250/204 |
| 4,247,762 | 1/1981 | Wilwerding | 250/204 |
| 4,333,007 | 6/1982 | Langlais et al. | 250/201 |
| 4,387,975 | 6/1983 | Araki | 354/25 |
| 4,412,741 | 11/1983 | Stein | 250/201 PF |
| 4,467,187 | 8/1984 | Tsunekawa et al. | 250/204 |
| 4,602,153 | 7/1986 | Suzuki | 250/201 PF |
| 4,636,624 | 1/1987 | Ishida et al. | 250/201 PF |

FOREIGN PATENT DOCUMENTS

118019 9/1980 Japan.
155331 12/1980 Japan.

Primary Examiner—David C. Nelms
Assistant Examiner—Stephone B. Allen
Attorney, Agent, or Firm—Fitzpatrick, Cella, Harper & Scinto

[57] ABSTRACT

A focus detection system for detecting a focus state of an object lens, includes an optical device for forming first and second light distributions corresponding to first and second images having light fluxes passing through the different parts of a pupila of the object lens. The positional relationship between the two light distributions varies in accordance with the focus state of the object lens. First and second sensors sense the first and second light distributions. A signal processor for processing output signals from the first and second sensors detect the focus state of the object lens in accordance with the positional relationships between the two light distributions. The signal processor processes the signals from the first and second sensors in accordance with a predetermined formula to obtain the positional relationship between the two images to determine a degree of coincidence of the two light distributions. The signal processing means provides an output signal in accordance with the degree of coincidence of the two light distributions.

21 Claims, 14 Drawing Sheets

FOCUS DETECTION SYSTEM EMPLOYING MULTIPLE AREA LIGHT DISTRIBUTION SENSORS

This application is a continuation of application Ser. No. 750,283 filed July 1, 1985, now abandoned.

BACKGROUND OF THE INVENTION

1. Field of the Invention

The present invention relates to a focus detection system for use in a camera, and more particularly to a focus detection system which can detect a focus in a far-near competition state which is caused by a plurality of objects of different object distances in a detection view field.

2. Description of the Prior Art

A focus detection system for a camera which detects a focus of an imaging lens by detecting a deviation between two images formed by dividing a pupil of the imaging lens of the camera is disclosed in U.S. Pat. No. 4,185,191 and Japanese Patent Application Laid-Open Nos. 118019/1980 and 155331/1980. In those systems, the two images formed are imaged on a sensor to photo-electrically convert the image information. The photo-electrically converted signals or the two images are processed to detect focus. The signal processing method is disclosed, for example, in U.S. Pat. No. 4,333,007. The signal processing method by the disclosed method is a excellent method for detecting a deviation from an in-focus position of a single image, but if a plurality of objects having different object distances are in a view field or if an object has a substantial three-dimensional spread, focus is set to a middle point of the plurality of objects in spite of the detection of the in-focus state by a calculation formula used in the processing and the focus is not set to a desired object. In the present specification, such a state of the objects is called "far-near competition".

A method which aims to resolve the problem of far-near competition is shown in Japanese Patent Application Laid-Open No. 75607/1981. However, this method does not completely resolve the problem of far-near competition.

A signal processing method used for detecting a focus is also shown in Japanese Patent Application No. 142306/1983 by the same inventor as that of the present invention. In this method, a drive distance (defocus distance) of a lens is determined based on a sum of minimum or maximum photo-electrically converted outputs of pixels corresponding to each other in a sensor for sensing the two images. However, this method also does not resolve the problem of far-near competition.

SUMMARY OF THE INVENTION

It is an object of the present invention to provide a system which can detects a "far-near competition" state.

It is another object of the present invention to provide a focus detection system which can determine a correct defocus distance of an object lens for any object.

DESCRIPTION OF THE PREFERRED EMBODIMENTS

Figure 1:
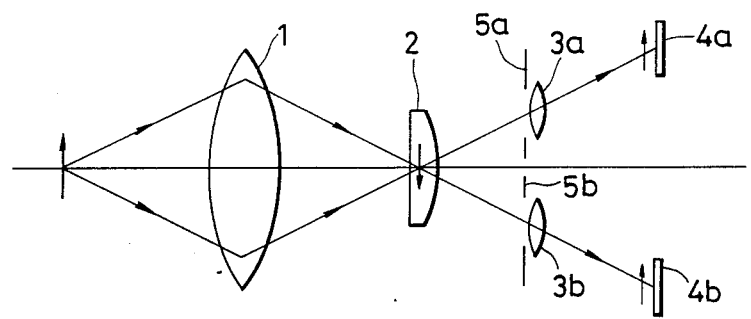
FIG. 1 is a plan view of a focus detection optical system of a secondary focusing system.

FIG. 1 shows an optical system used in the focus detection system of the present invention. A principle of focus detection of this optical system is called a secondary focusing system. The principle is explained below.

In FIG. 1, a field lens 2 to be adjusted in focus state thereof is arranged coaxially with an optical axis of an imaging lens 1, and two secondary focusing lenses 3a and 3b are arranged therebehind, and photosensor arrays 4a and 4b are arranged therebehind. Numerals 5a and 5b denote stops arranged near the secondary focusing lenses 3a and 3b. The field lens 2 essentially focuses an exit pupil of the imaging lens 1 onto pupil planes of the secondary focusing lenses 3a and 3b. As a result, light fluxes impinging to the secondary focusing lenses 3a and 3b are those emitted from non-overlapping, equal-size areas on the exit pupil plane of the imaging lens 1 corresponding to the secondary focusing lenses 3a and 3b. When the spatial image formed in the vicinity of the field lens 2 is refocused onto the planes of the sensor arrays 4a and 4b by the secondary focusing lenses 3a and 3b, the positions of the two refocused images vary depending on a change of a position in the optical axis direction at which the spatial image is formed.

Figure 2A:
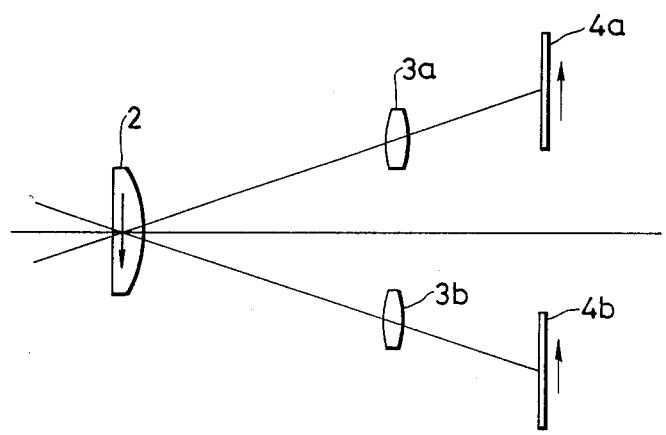
FIGS. 2A, 2B and 2C are plan views for illustrating a principle of focus detection in the optical system of FIG. 1.
Figure 2B:
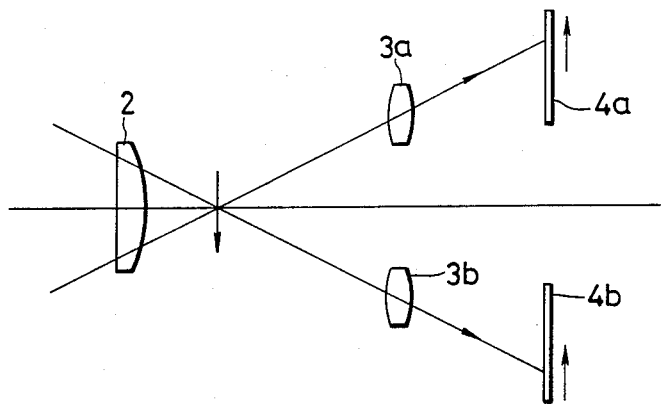
Figure 2C:
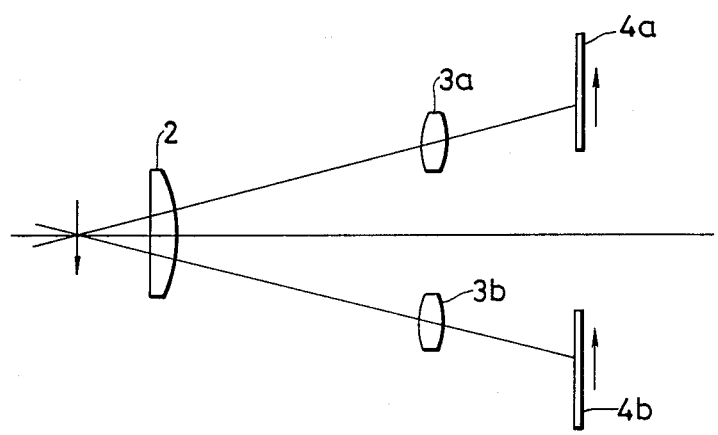

FIG. 2 illustrates this phenomenon. FIG. 2A shows an in-focus state, FIG. 2B shows a rear-focus state and FIG. 2C shows a fore-focus state. The two images formed on the planes of the sensor arrays 4a and 4b move oppositely on the planes of the sensor arrays 4a and 4b. An image intensity distribution is photo-electrically converted by the sensor arrays 4a and 4b and a relative positional difference between the two images is detected by an electric processing circuit to determine the focus state.

In accordance with a basic concept of the present invention, in the far-near competition state, a degree of coincidence of two images is lower than that in a normal state because the relative positional relation varies with the focus state of the imaging lens 1 (see FIG. 1) and the far-near competition state in the view field can be detected by checking the degree of coincidence. The degree of coincidence can be determined by one of the following two methods.

In the first method, a method disclosed in the U.S. Ser. No. 605,539 filed by the same inventor of the present invention is used. A correlation amount is calculated by $$V(m) = \sum_i \{|a(i) - b(i+1-m)| - |a(i+1) - b(i-m)|\} \quad (1)$$

where N is the number of photo-electric conversion devices of the sensor arrays 4a and 4b, and a(i) and b(i) (i=1∼N) are outputs of i-th photo-electric conversion devices of the sensor arrays 4a and 4b. The correlation amount V(m) derived from the formula (1) is nothing but a change of U(m) calculated by $$U(m) = \sum_i |a(i) - b(i-m)| \quad (2)$$

U(m) is a scale for the degree of coincidence of two images when the relative displacement is m. It is minimum when the deviation between the two images is minimum, that is, when the two images are coincident. At this time, V(m) which represents the change of U(m) is to be zero.

Figure 3A:
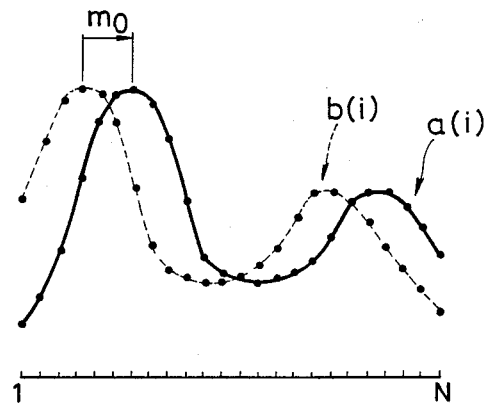
FIG. 3A shows an image signal for a two-dimensional object in an out-of-focus state, FIGS. 3B and 3C respectively show an evaluation amount $U(m)$ curve and a correlation amount $V(m)$ curve based on the image signal shown in FIG. 3A in a first embodiment of the present invention.
Figure 3B:
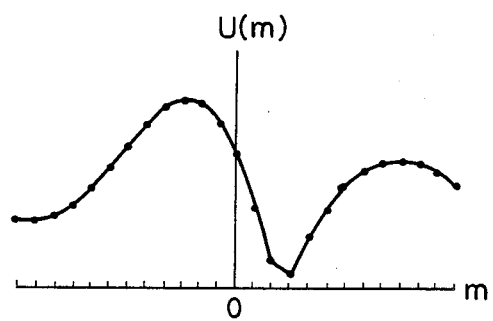
FIGS. 3D and 3E show evaluation reference amount curves $U_1(m)$, $U_2(m)$ and correlation amount $V_1(m)$, $V_2(m)$ curves based on the image signal shown in FIG. 3A in a second embodiment of the present invention.
Figure 3C:
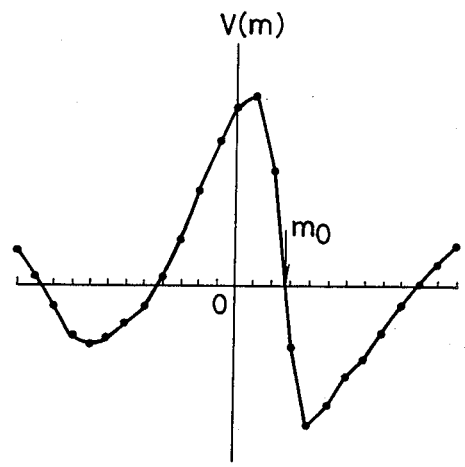
Figure 4A:
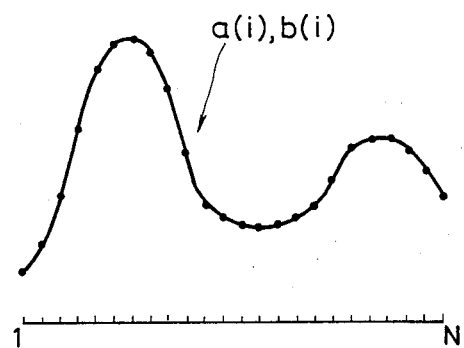
FIG. 4A shows an image signal for a two-dimension object in an in-focus state, FIGS. 4B and 4C respectively show an evaluation amount $U(m)$ curved and a correlation amount $V(m)$ curve based on the image signal shown in FIG. 4A in the first embodiment of the present invention.

FIG. 3A shows signals a(i) and b(i) illustrating light intensity distributions of the two images, where N=24. FIGS. 3B and 3C show plots of U(m) and V(m) in the formulas (1) and (2) (m=−N/2∼N/2). As seen from 3C, an image deviation corresponding to 2.6 pixels can be detected when $V(m_0)=0$. A defocus distance of the imaging lens 1 is calculated based on $m_0$ and the lens is driven so that the two images coincide as shown in FIG. 4A. At this time, U(o)=0 and V(o)=0 as seen from FIGS. 4B and 4C.

The characteristic of the first embodiment of the present invention resides in the discovery that the degree of coincidence can be evaluated by the value of the formula (2) when m=0, that is, by $$U(o) = \sum_i |a(i) - b(i)| \quad (5)$$

Figure 4B:
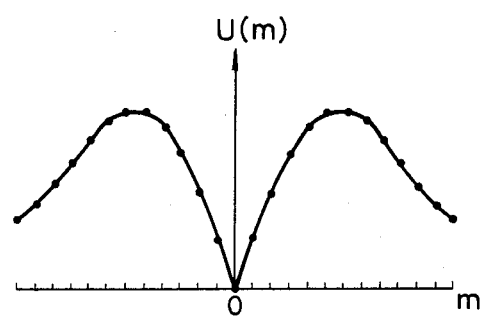
FIGS. 4D and 4E show evaluation reference amount curves $U_1(m)$, $U_2(m)$ and correlation amount $V_1(m)$, $V_2(m)$ curves based on the image signal shown in FIG. 4A in the second embodiment of the present invention.
Figure 4C:
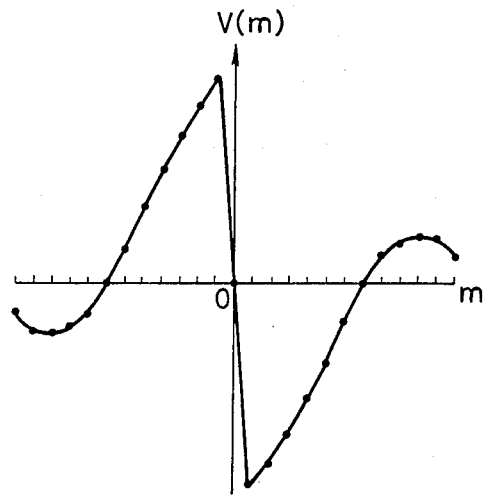
Figure 6A:
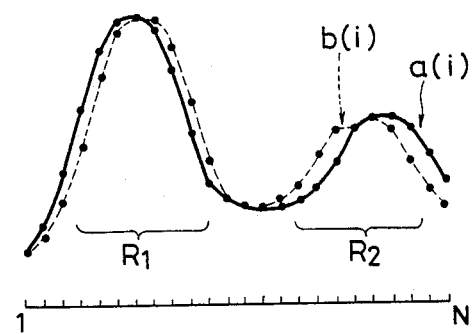
FIG. 6A shows an image signal for a three-dimensional object in an in-focus state, FIGS. 6B and 6C respectively show an evaluation amount $U(m)$ curves and a correlation amount $V(m)$ curve based on the image signal shown in FIG. 6A in the first embodiment of the present invention.
Figure 6B:
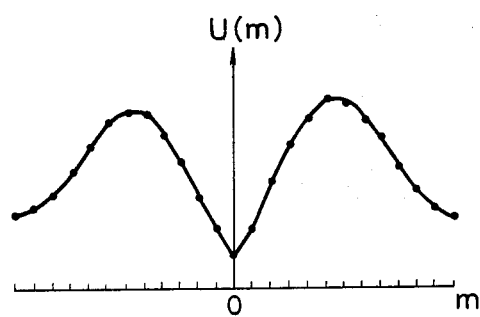
FIGS. 6D and 6E show evaluation reference amount curve $U_1(m)$, $U_2(m)$ and correlation amount $V_1(m)$, $V_2(m)$ based on the image signal shown in FIG. 6A in the second embodiment of the present invention.
Figure 6C:
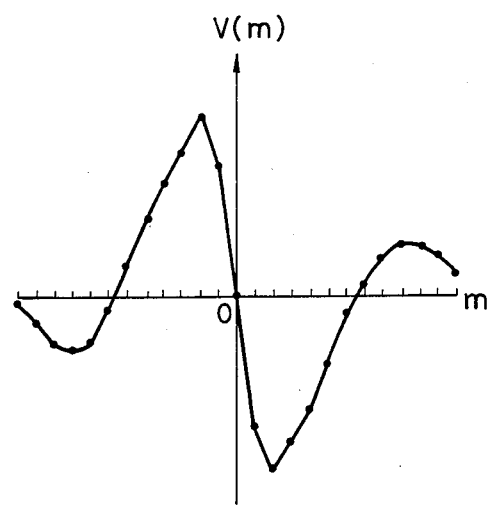
Figure 6D:
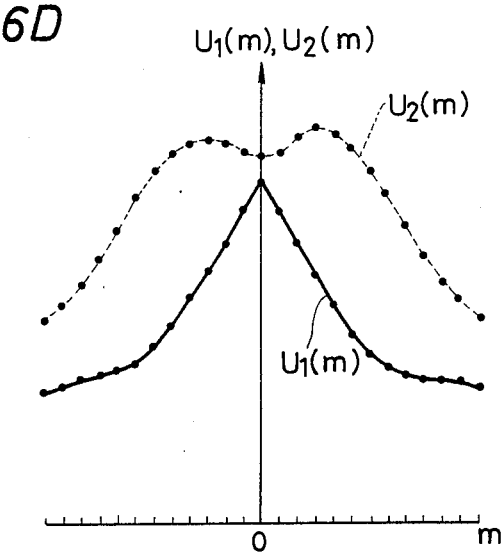
Figure 6E:
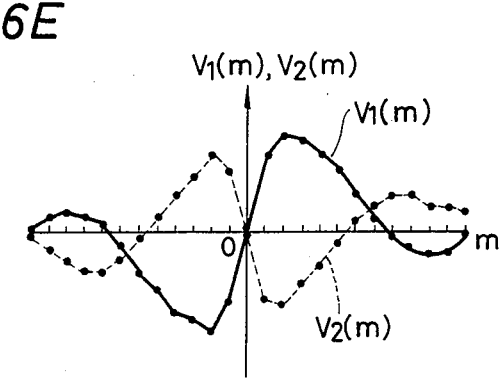

For example, in a normal case where the image signals a(i) and b(i) is shown in FIG. 4A are produced, $U(o) \approx 0$ if $m_0$ which satisfies $V(m_0)=0$ is 0 in the formula (1) as seen from FIGS. 4B and 4C but U(o)>0 even if $m_0=0$ in the far-near competition state shown in FIG. 6A. Accordingly, whether the object in the view field is in the far-near competition state or not can be determined by comparing U(o) in the in-focus state of the imaging lens 1 with a predetermined threshold.

Figure 7A:
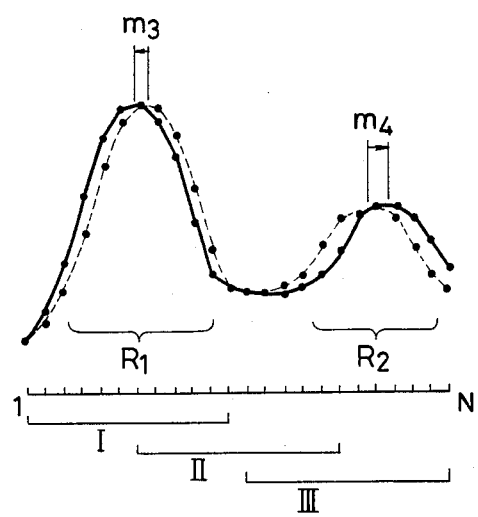
FIG. 7A shows a division method of the image signal in the two embodiments of the present invention.

When it is determined that the object in the view field is in the far-near competition state, an alarm may be issued. In the present embodiment, the area of the image signals a(i) and b(i) is divided into partially overlapping areas I, II and III as shown in FIG. 7A and V(m) in each area is calculated in accordance with the formula (1). In FIG. 7A, the number of data (the number of photo-electric conversion devices) in each of the areas I, II and III is N/2 (=12). The values of $V_I(m)$ are represented by $V_I(m)$, $V_{II}(m)$ and $V_{III}(m)$ in order to distinguish them from those for N=24.

Figure 7B:
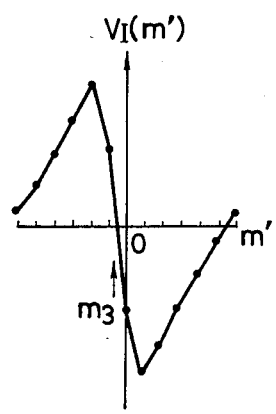
FIGS. 7B, 7C and 7D show correlation amount curves in divisional areas of the image signal divided by the division method shown in FIG. 7A in the first embodiment of the present invention.
Figure 7C:
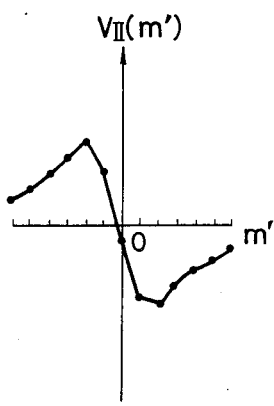
Figure 7D:
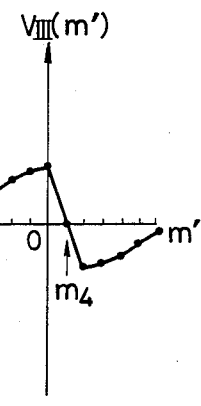

FIGS. 7B, 7C and 7D show plots of $V_I(m)$, $V_{II}(m)$ and $V_{III}(m)$. Since the area I includes only the image signal in an area R of FIG. 7A, $m_3$ which satisfies $V_I(m_3)=0$ in FIG. 7B shows the deviation distance of includes only the image signal in an area $R_2$, $m_4$ which satisfies $V_{III}(m_4)=0$ in FIG. 7D shows the deviation distance of the two images in the area $R_2$.

The area II partially includes both areas $R_1$ and $R_2$. Thus, $V_{II}(m)$ in FIG. 7C shows the deviation distance affected by local far-near competition. Relative displacements $m_3$ and $m_4$ correspond to the lens drive distances (defocus distances) to bring the imaging lens into the in-focus state in the object areas $R_1$ and $R_2$. For example, if it is desired to bring the imaging lens 1 into the in-focus state for the object in the near object area $R_1$, $m_3$ is selected, and if it is desired to bring the imaging lens 1 into the in-focus state for the object in the far object area $R_2$, $m_4$ is selected. The selection may be preset or externally controlled. In FIG. 7A, N discrete image signals are divided into three partially overlapping areas each having N/2 data, although other division methods may be adopted with respect to the time period which it takes to complete the focus operation. The amount of calculation time for V(m) having N/2 data is approximately ¼ of the amount of calculation time for V(m) having N data. Even if the calculation for V(m) having N/2 data is repeated three times, the total amount is only ¾ of the amount of calculation time for V(m) having N data. Accordingly, the calculation time in the present embodiment including the calculation time of U(o) for determining the far-near competition state is not longer than the calculation time of the normal calculation.

Am embodiment for detecting the focus and an operation flow thereof are explained with reference to FIGS. 8 and 9.

Figure 8:
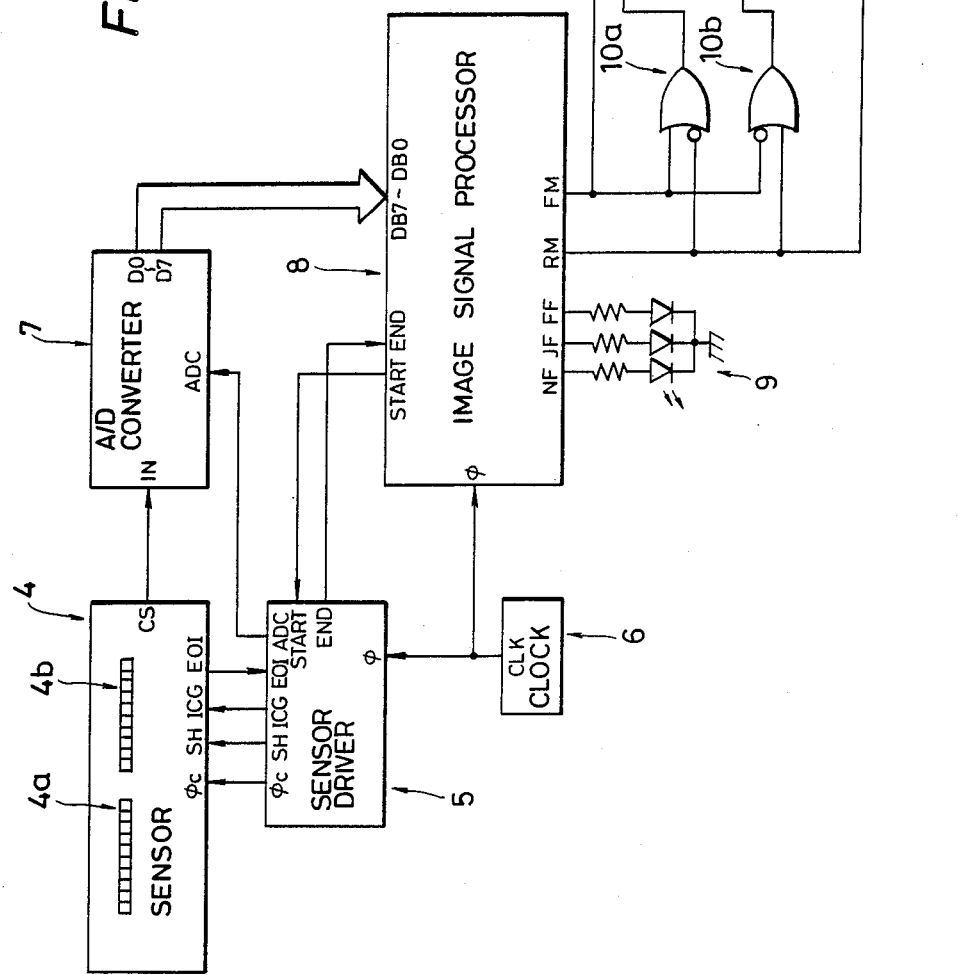
FIG. 8 shows a circuit diagram of one embodiment of a focus detection system of the present invention.

FIG. 8 shows an embodiment of the focus detection system of the present invention. An optical system for forming two images whose relative positional relationship varies with the focus state of the imaging lens is that shown in FIG. 1. Numeral 8 denotes an image signal processor which may be a one-chip microcomputer having a CPU, a memory and input/output terminals. The sensor 4 comprises the sensor arrays 4a and 4b and a CCD, and images are formed on the plate-sensing planes of the sensor arrays 4a and 4b by light fluxes passing through different pupil areas of the imaging lens 1. Charges corresponding to the light intensity distributions of the images are stored and transferred by control signals $\phi_c$, SH, ICG from a sensor driver 5. While the sensor array 4a and 4b are separated in the present embodiment, they may be arranged in one array. When the image signal processor 8 supplies a start signal to the sensor driver 5, the sensor driver 5 sends a start of storage signal ICG together with a clock pulse $\phi_c$ generated by a signal CLK of a clock generator 6, to the sensor 4. The sensor 4 thus starts to store the two images, and when a predetermined storage level is reached, it sends an end of storage signal EOI to the sensor driver 5. The sensor driver 5 sends a photo-electric conversion output transfer signal SH to the sensor 4 to transfer the stored charges from the sensor to the CCD, and it also sends an end signal to the processor 8. The sensor 4 sends the analog photo-electric converted signal CS of the two images which represents the time-serially stored charges, to an A/D converter 7 in synchronism with the clock $\phi_c$ from the sensor driver 5. The A/D converter 7 converts the analog signal to an 8-bit digital signal in synchronism with a conversion signal ADC from the sensor driver 5. The processor 8 receives the digital time-serial signals $D_0 \sim D_7$ through terminals $DB_0 \sim DB_7$ and sequentially stores them in the memory. The processor 8 detects the deviation of the two images (relative displacement) based on the A/D converted photo-electric converted signal, that is, the image signals a(i) and b(i) (i=1~N), where a(i) and b(i) were defined above.

Terminals RM and FM of the processor 8 are output terminals for driving a motor 12 for driving the imaging lens 1 (FIG. 1) along the optical axis direction. When RM and FM are both at high potential ("H"), transistors 11a and 11c are turned off and transistors 11b and 11d are turned on through gates 10a and 10b, and the motor 12 is electrically braked by the transistors 11b and 11d and diodes 13a and 13b. When RM and FM are both at low potential ("L"), the transistors 11a~11d are all turned off and the motor 12 is electrically opened. When RM is "H" and FM is "L", the transistors 11a and 11d are turned off and the transistors 11b and 11c are turned on, and the motor 12 is energized from right to left in FIG. 8. When RM is "L" and FM is "H", the transistors 11b and 11c are turned off and the transistors 11a and 11d are turned on, and the motor 12 is energized from left to right so that the motor 12 is driven in the opposite direction to that when RM is "H" and FM is "L". Terminals NF, JF and FF are drive terminals to LED's 9 which indicate the focus state.

Figure 9A:
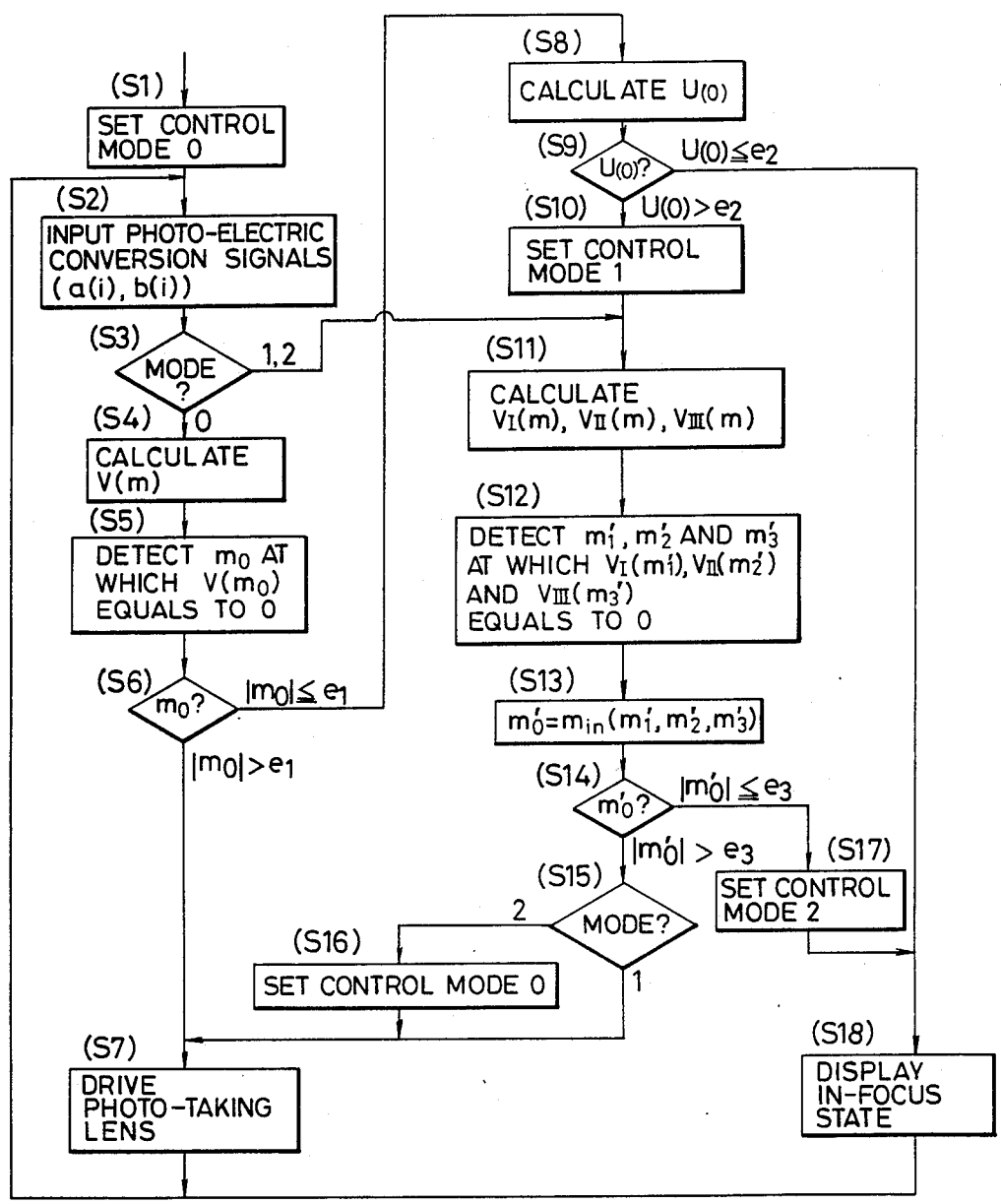
FIG. 9A is a flow chart showing a signal processing method in the first embodiment of the present invention.

The operation flow of the present embodiment is explained with reference to FIG. 9A. In this flow, an object in a near object area is selected when the far-near competition state occurs. Functions of the steps in the flow chart of FIG. 9A are explained below.

(S1) Set a control mode to "0". The mode 0 indicates normal signal processing, mode 1 indicates the far-near competitionstate and mode 2 indicates the in-focus state in the far-near competition state.

(S2) Receive the photo-electric converted signals a(i) and b(i) (i=1~N) of the two images formed by the pupil division of the imaging lens, from the sensor.

(S3) Identify the mode.

(S4) If the mode 0 is identified, calculate V(m) by the normal signal processing.

(S5) Detect deviation $m_0$ which satisfies $V(m_0)=0$.

(S6) Compare an absolute value of the deviation $m_0$ with an in-focus threshold $e_1$.

(S7) If $|m_0| > e_1$, it means that the imaging lens is in an out-of-focus state. Drive the imaging lens 1 by a lens drive distance (defocus distance) corresponding to the relative displacement $m_0$. Return to S2.

(S8) If $m_0 \leq e_1$, it means that the in-focus state has been obtained by the normal signal processing. Calculate V(o) to check the far-near competition.

(S9) Compare U(o) with a far-near competition threshold $e_2$.

(S10) If $U(o) > e_2$, it means that the far-near competition state has occurred. Set the control mode to "1".

(S18) If $U(o) \leq e_2$, it means that the far-near competition state has not occurred. Indicate the in-focus state. Return to S2.

(S11) Divide the area of the image signal as shown in FIG. 7A and calculate correlation amounts $V_I(m')$, $V_{II}(m')$ and $V_{III}(m')$ with the number of data being N/2.

(S12) Detect $m_1'$, $m_2'$ and $m_3'$ which satisfy $V_I(m'_1)=0$, $V_{II}(m'_2)=0$ and $V_{III}(m'_3)=0$, respectively. They indicate deviations in each of three partially overlapping divisional areas of the original image signal.

(S13) Set a minimum one of $m_1'$, $m_2'$ and $m_3'$ as $m_0'$ so that the imaging lens 1 is brought into the in-focus state for the object in the near object area when the far-near competition status occurs.

(S14) Compare the deviation $m_0'$ with an in-focus threshold $c_3$ for the far-near competition state.

(S15) If $|m_0'| > e_3$, it means that the imaging lens is not in the in-focus state and the lens is to be driven. Check the mode again. If it is the mode 1, it means that the focusing by the far-near competition is in progress. Drive the imaging lens 1 in S7.

(S16) If it is the mode 2, it means that the in-focus state was once obtained in the far-near competition state and then the out-of-focus state occurred because of change of the object. Set the mode to "0" (normal signal processing mode) and drive the lens in S7.

(S17) If $|m_0'| \leq e_3$, it means that the in-focus state has been obtained in the far-near competition signal processing. Set the mode to "2" and indicate the in-focus state in S18.

In the above steps, $e_1$, $e_2$ and $e_3$ may be arbitrarily set, and a maximum one or a medium one of $m_1'$, $m_2'$ and $m_3'$ may be selected as $m_0'$ in the step S13.

The evaluation amount U(o) in the present embodiment is not limited to the formula (5) but it may be represented by the following formula $$U(o) = \sum_i |a(i) - b(i)|^P \qquad (6)$$

where P is a positive number.

The correlation amount V(m) may be calculated by $$V(m) = \sum_i \{|a(i) - b(i+1-m)|^P - |a(i+1) - b(i-m)|^P\} \quad (7)$$

In a second embodiment of the present invention, the following formulas (1a) and (2a) are used instead of the formulas (1) and (2) described above. This method uses the system described in the U.S. Ser. No. 667,818 filed by the same assignee as that of the present invention. In the second embodiment, the correlation amount is calculated by $$V_1(m) = \sum_i [\min\{a(i), b(i+1-m)\} - \min\{a(i+1), b(i-m)\}] \quad (1a)$$

or $$V_2(m) = \sum_i [\max\{a(i), b(i+1-m)\} - \max\{a(i+1), b(i-m)\}] \quad (2a)$$

where min(x,y) and max(x,y) represent to select smaller and larger ones of the two quantities x and y, respectively.

The correlation amounts $V_1(m)$ and $V_2(m)$ calculated by the formulas (1a) and (2a) are nothing but changes of $U_1(m)$ and $U_2(m)$ calculated by the following formulas.

$$U_1(m) = \sum_i \min\{a(i), b(i-m)\} \quad (3a)$$

$$U_2(m) = \sum_i \max\{a(i), b(i-m)\} \quad (4a)$$

$U_1(m)$ and $U_2(m)$ are scales of degree of coincidence of two images when the relative displacement is m. When the deviation of the two images is minimum, that is, when they coincide, $U_1(m)$ is maximum and $U_2(m)$ is minimum. At this time, $V_1(m)$ and $V_2(m)$ which represent the change of $U_1(m)$ and $U_2(m)$ are to be zero.

Let us assume that the sensor arrays 4a and 4b detect the image light intensity distribution shown in FIG. 3A.

Figure 3D:
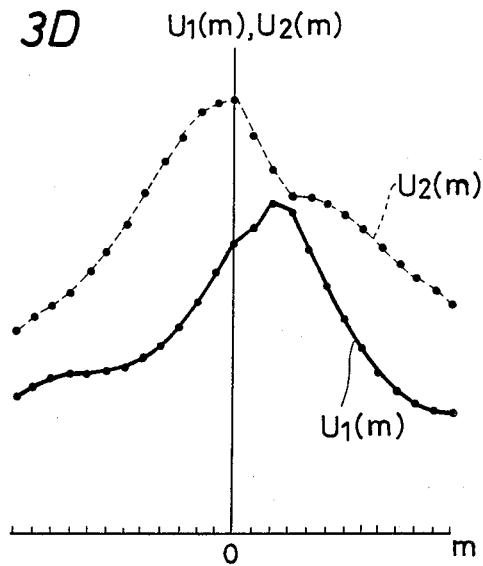
Figure 3E:
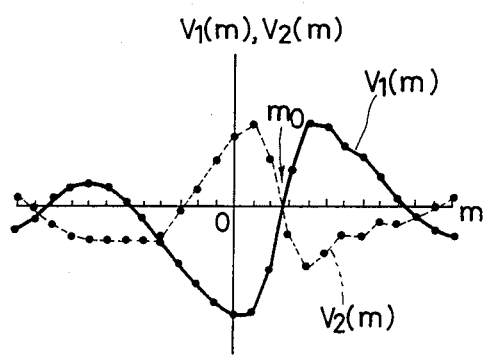

FIGS. 3D and 3E show plots of $U_1(m)$, $U_2(m)$, $V_1(m)$, $V_2(m)$ (m = −N/2 ~ N/2) in the formulas (1a) ~ (4a). As seen from FIG. 3E, m which satisfies $V_1(m)=0$ and $V_2(m)=0$ is equal to 2.6, and the image deviation corresponding to 2.6 pixels can be detected by using the correlation amount of either the formula (1a) or the formula (2a). Then, the defocus distance of the imaging lens 1 is calculated based on $m_0$ and the lens is driven into the in-focus state. Thus, the image signals a(i) and b(i) coincide as shown in FIG. 4A. At this time, $U_1(o) = U_2(o)$, $V_1(o) = 0$, $V_2(o) = 0$ as seen from FIGS. 4D and 4E.

The characteristic of the second embodiment of the present invention resides in the finding that the degree of coincidence can be evaluated by the formulas (3a) and (4a) when m=0, that is, $$W = U_2(o) - U_1(o) \quad (7a)$$
$$= \sum_i \max\{a(i), b(i)\} - \sum_i \min\{a(i), b(i)\}$$

Figure 4D:
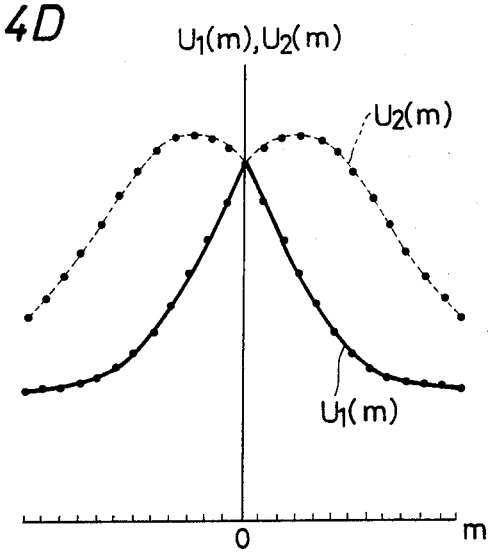
Figure 4E:
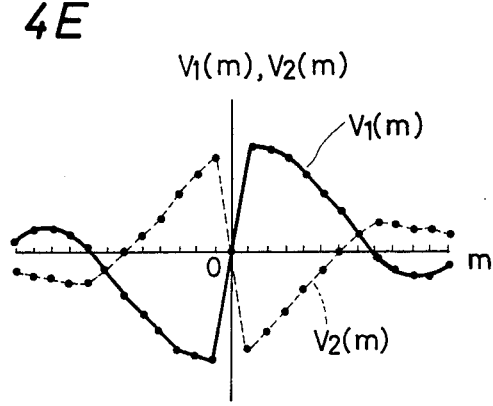
Figure 5A:
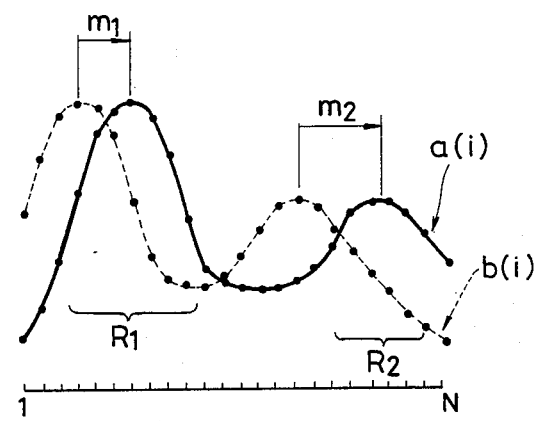
FIG. 5A shows an image signal for a three-dimension object in an out-of-focus state, FIGS. 5B and 5C respectively show an evaluation amount $U(m)$ curved and a correlation amount $V(m)$ curve based on the image signal shown in FIG. 5A in the first embodiment of the present invention.
Figure 5B:
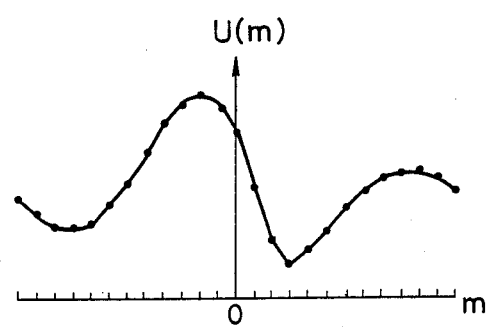
FIGS. 5D and 5E shows evaluation reference amount curve $U_1(m)$, $U_2(m)$ and correlation amount $V_1(m)$, $V_2(m)$ curves based on the image signal shown in FIG. 5A in the second embodiment of the present invention.
Figure 5C:
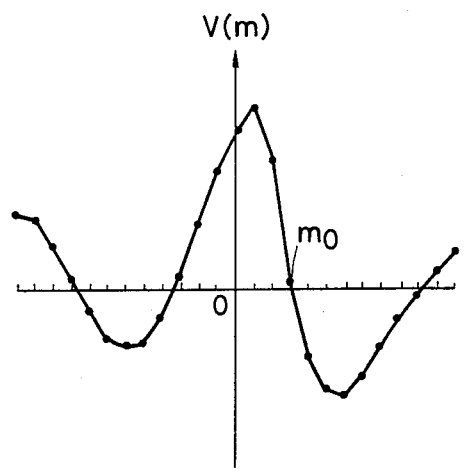
Figure 5D:
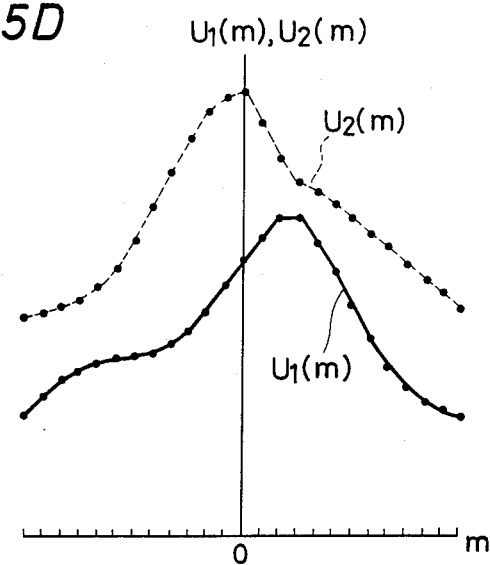
Figure 5E:
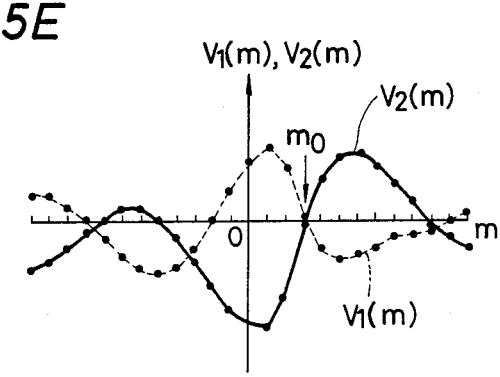

For example, in the normal case where the image signals a(i) and b(i) shown in FIG. 4A are produced, if $m_0$ which satisfied $V_1(m_0)=0$ or $V_2(m_0)=0$ in $V_1(m)$ or $V_2(m)$ defined by the formula (1a) or (2a) is zero, $U_1(o) - U_2(o)$ or $W = U_2(o) - U_1(o) = 0$ as seen from FIGS. 4D and 4E, but in the far-near competition status shown in FIG. 6A, $U_2(o) > U_1(o)$ or $W = U_2(o) - U_1(o) > 0$ even if $m_0$ which satisfies $V_1(m_0)=0$ or $V_2(m_0)=0$ is zero. Accordingly, whether the object in the view field is in the far-near competition state or not can be determined by comparing W in the in-focus state of the imaging lens 1 with a predetermined threshold.

If the object in the view field is in the far-near competition state, an alarm may be issued In the present embodiment, the area of the signals a(i) and b(i) is divided into partially overlapping divisional areas I, II and III as shown in FIG. 7A, and $V_1(m)$ or $V_2(m)$ is calculated for each divisional area. In FIG. 7A, the number of data (the number of photo-electric conversion devices) in each of the areas I, II and III is equal to N/2 (=12). $V_1(m)$ and $V_2(m)$ in this case are represented by $\{V_{1I}(m), V_{1II}(m), V_{1III}(m)\}$, $\{V_{2I}(m), V_{2III}(m)\}$. Since the area in order to distinguish them from those for N=24.

Figure 7E:
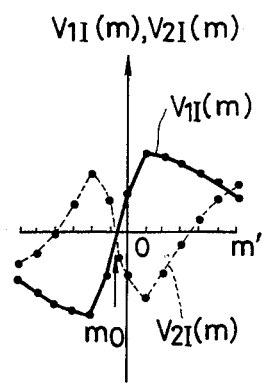
FIGS. 7E, 7F and 7G show correlation amount curves in divisional areas of the image signal divided by the division method of FIG. 7A in the second embodiment of the present invention.
Figure 7F:
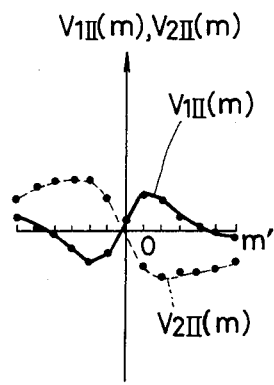
Figure 7G:
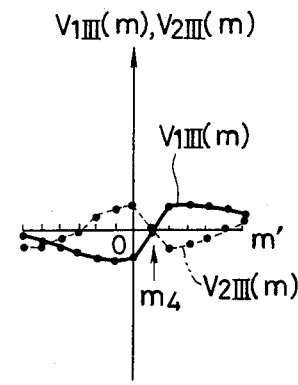

FIGS. 7E, 7F and 7G show plots of $\{V_{1I}(m), V_{2I}(m)\}$, $\{V_{1II}(m), V_{2II}(m)\}$, $\{V_{1III}(m), V_{2III}(m)\}$. Since the area I includes the image signal in only the object area $R_1$ of FIG. 7A, $m_2$ which satisfies $V_{1I}(m_2)=0$ or $V_{2I}(m_3)=0$ in FIG. 7E represents the deviation of the two images in the area $R_1$, and since the area III includes the image signal in only the object area $R_2$, $m_4$ which satisfies $V_{1III}(m_4)=0$ or $V_{2III}(m_4)=0$ in FIG. 7G indicates the deviation of the two images in the area $R_2$. The area II partially includes both areas $R_1$ and $R_2$. Thus, $V_{1II}(m)$ or $V_{2II}(m)$ in FIG. 7E shows the deviation distance affected by local far-near competition Relative displacements $m_3$ and $m_4$ correspond to the lens drive distances (defocus distances) to bring the imaging lens into the in-focus state in the object areas $R_1$ and $R_2$. For example, if it is desired to bring the imaging lens 1 into the in-focus state for the object in the near object area $R_1$, $m_3$ is selected, and if it is desired to bring the imaging lens 1 into the in-focus state for the object in the far object area $R_2$, $m_4$ is selected. The selection may be preset or externally controlled. In FIG. 7A, N discrete image signals are divided into three partially overlapping areas each having N/2 data, although other division method may be adopted with respect to the time period which it takes to complete the focus operation. The amount of calculation time for $V_1(m)$ or $V_2(m)$ having N/2 data is approximately ¼ of the amount of calculation time for $V_1(m)$ or $V_2(m)$ having N data. Even if the calculation for $V_1(m)$ or $V_2(m)$ having N data is repeated three times, the total amount of calculation time is only ¾ of the amount of calculation time for $V_1(m)$ or $V_2(m)$ having N data. Accordingly, the calculation time in the present embodiment including the calculation time of W for determining the far-near competition state is not longer than the calculation time of the normal calculation.

Figure 9B:
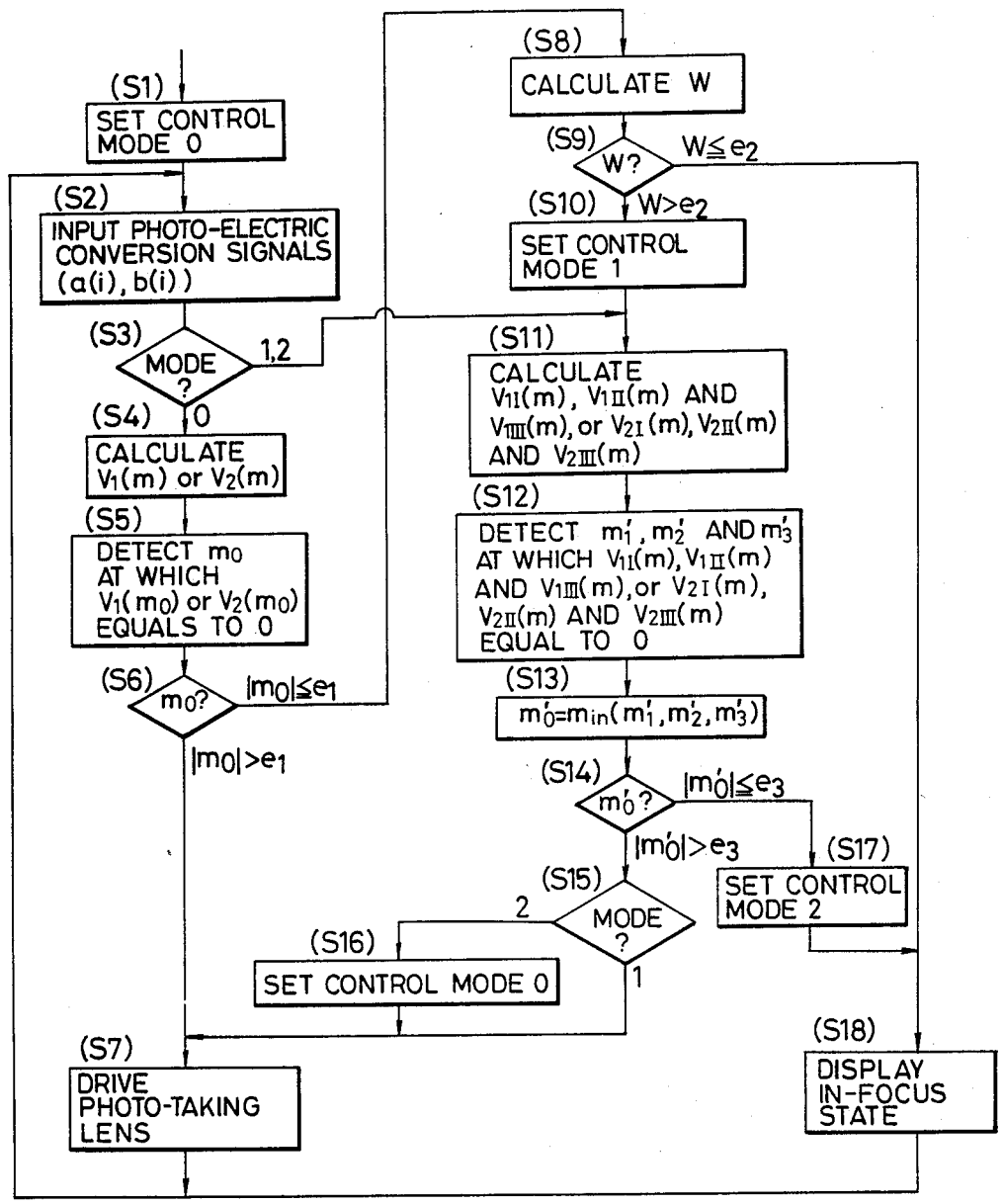
FIG. 9B is a flow chart showing a signal processing method in a second embodiment of the present invention.

The operation flow of the present embodiment is now explained with reference to FIG. 9B. In this flowchart, the object in the near object area is selected when the far-near competition state occurs, as is done in the first embodiment.

Steps (S1) to (S3) are identical to the steps (S1) to (S3) of the first embodiment.

(S4) If the mode is mode 0, calculate $V_1(m)$ or $V_2(m)$ in the normal signal processing.

(S5) Detect the deviation (relative displacement) $m_0$ which satisfies $V_1(m_0)=0$ or $V_2(m_0)=0$.

(S6) Compare an absolute value of the deviation $m_0$ with the in-focus state threshold $e_1$.

(S7) If $m_0 > e_1$, it means that the imaging lens is in the out-of-focus state. Drive the imaging lens 1 by the lens drive distance (defocus distance) corresponding to $m_0$. Return to S2.

(S8) If $|m_0| \leq e_1$, it means that the in-focus state has been obtained by the normal signal processing. Calculate $W = U_2(o) - U_1(o)$ to check the far-near competition status.

(S9) Compare W with the far-near competition threshold $e_2$.

(S10) If $W > e_2$, it means that the far-near competition status has occurred. Set the control mode to "1".

(S11) Divide the area of the image signal to divisional areas each having N/2 data as shown in FIG. 7A. Calculate the correlation amount $V_{1I}(m')$, $V_{2I}(m')$, $V_{1II}(m')$, $V_{2II}(m')$, $V_{1III}(m')$ or $V_{2III}(m')$. (S12) Detect $m_1'$, $m_2'$ and $m_3'$ which satisfy $V_{1I}(m_1')=0$, $V_{2I}(m_1')=0$, $V_{1II}(m_2')=0$, $V_{2II}(m_2')=0$, $V_{1III}(m_3')=0$ or $V_{2III}(m_3')=0$. They represent the deviations in the three partially overlapping divisional areas.

(S13) Set a minimum one of $m_1'$, $m_2'$ and $m_3'$ as $m_0'$ so that the imaging lens 1 is brought into the in-focus state for the object in the near object area when the far-near competition state occurs.

(S14) Compare the deviation $m_0'$ with the in-focus state threshold $e_3$ in the far-near competition state.

(S15) If $|m_0'| > e_3$, it means that the imaging lens is to not in the in-focus state and the imaging lens is to be driven. Check the mode again. If it is the mode 1, it means that the focusing operation by the far-near competition is in progress. Drive the imaging lens 1 is S7. Maintain the mode 1 and return to S2.

(S16) If the mode is mode 2, it means that the in-focus state was once obtained in the far-near competition state and then the out-of-focus state occurred because the object significantly changed. Set the mode to "0" normal signal processing mode) and drive the lens in S7.

(S17) If $|m_0'| \leq e_3$ in S14, it means that the in-focus state has been obtained in the far-near competition state. Set the mode to "2". Indicate the in-focus state in S15.

(S18) If $W \leq e_2$, it means that the far-near competition state has not occurred. Indicate the in-focus state and return to S2.

In the above flow, $e_1$, $e_2$ and $e_3$ may be arbitrarily set. A maximum one or a medium one of $m_1'$, $m_2'$ and $m_3'$ may be selected in the step S13.

In the first and second embodiments, the formula to calculate the positional deviation of the two images is used to evaluate the degree of coincidence of the two images. Alternatively, the evaluation formula in the second embodiment may be used in the first embodiment or vice versa.

In accordance with the present invention, the far-near competition status can be determined so that the accurate focus detection is attained under any condition.

We claim:

1. A focus detection system for detecting a focus state of an object lens, comprising:
    optical means for forming first and second light distributions respectively corresponding to first and second images having light reflective fluxes passing through the different parts of the object lens, whereby the positional relationship between said first and second light distributions varies in accordance with the focus state of the object lens;
    first and second sensing means for sensing said first and second light distributions, said first and second sensing means each having a plurality of sensor elements; and
    signal processing means for processing output signals from said first and second sensing means to detect the focus state of the object lens in accordance with the positional relationship between the two light distributions;
    said signal processing means processing the signals from said first and second sensing means in accordance with a predetermined formula to determine a degree of coincidence of the said light distributions, said signal processing means providing an output signal in accordance with the degree of similarity of said two light distributions, and said signal processing means detecting a focus state of the object lens by processing signals from two groups of sensor elements being provided in corresponding positions, and each having the same number of sensor elements, which number is smaller than the total number thereof.

2. A focus detection system according to claim 1 wherein said first and second sensing means each including a plurality of photo-electric conversion devices, and the degree of coincidence U is given by $$U = \sum_i |a(i) - b(i)|^P$$

where a(i) is an output from an i-th photo-electric conversion device of said first sensing means, b(i) is an output from an i-th photo-electric conversion device of said second sensing means, and P is a positive number.

3. A focus detection system according to claim 1 wherein said first and second sensing means each including a plurality of photo-electric conversion devices, and the degree of coincidence U is given by $$U = \sum_i \max\{a(i), b(i)\} - \sum_i \min\{a(i), b(i)\}$$

where a(i) is an output from an i-th photo-electric conversion device of said first sensing means, b(i) is an output from as i-th photo-electric conversion device of said second sensing means, min represents a smaller one of two real numbers x and y, and max 4. A focus detection system according to claim 1 wherein the outputs of said first and second sensing means are divided into a plurality of partially overlapping areas for each of said first and second images. represents a larger one of the two real numbers x and y.

5. A focus detection system according to claim 1, further comprising display means which displays the state of the focus detection in accordance with the degree of coincidence of the two light distributions in response to the output from said signal processing means.

6. A focus detection system for detecting a focus state of an object lens, comprising:
    optical means including an object lens for forming first and second light distributions respectively corresponding to first and second images having respective light fluxes passing through different parts of a pupil of the object lens wherein the positional relationship between said first and second light distributions varies with the focus state of said object lens;

first and second sensing means for sensing said first and second images, respectively; and signal processing means for processing output signals from said first and second sensing means to obtain the positional relationship between said two images to detect the focus state of the object lens;

said signal processing means processing the signals from said first and second sensing means in accordance with a predetermined formula to determine a degree of coincidence of the two images, and when the degree of coincidence is larger than a predetermined value, dividing the outputs of said first and second sensing means into a plurality of areas for each of said first and second images, determining a value representing the positional relationship of said light distributions corresponding to said first and second images for each area, and determining the focus based on said values.

7. A focus detection system according to claim 6 wherein said first and second sensing means each including a plurality of photo-electric conversion devices, and the degree of coincidence U is given by $$U = \sum_i |a(i) - b(i)|^P$$

where a(i) is an output from an i-th photo-electric conversion device of said first sensing means, b(i) is an output from an i-th photo-electric conversion device of said second sensing means, and P is a positive number.

8. A focus detection system according to claim 6 wherein said first and second sensing means each including a plurality of photo-electric conversion devices, and the degree of coincidence U is given by $$U = \sum_i \max\{a(i),b(i)\} - \sum_i \min\{a(i),b(i)\}$$

where a(i) is an output from an i-th photo-electric conversion device of said first sensing means, b(i) is an output from an i-th photo-electric conversion device of said second sensing means, min{x, y} represents a smaller one of two real numbers x and y, and max{x, y} represents a larger one of the two real numbers x and y.

9. A focus detection system according to claim 6 wherein the outputs of said first and second sensing means are divided into a plurality of partially overlapping areas for each of said first and second images.

10. A method for detecting a focus state of an object lens, comprising the steps of:

forming first and second images whose positional relationship varies with the focus state of said object lens;

sensing said first and second images by first and second sensing means each having a plurality of sensor elements; and processing output signals obtained in said sensing step to detect the focus state of the object lens;

said signal processing steps processing the signals obtained from said sensing step in accordance with a predetermined formula to determine a degree of coincidence of said two light distributions and said signal processing step dividing an output signal is accordance with the degree of coincidence of said two light distributions, and said signal processing steps detecting a focus state of said object lens by processing signals from two groups of said sensor elements being provided in corresponding positions, and each having the same number of sensor elements, which number is smaller than the total number thereof.

11. A focus detection method according to claim 10 wherein first and second sensing means used in said sensing step each including a plurality of photoelectric conversion devices, and the degree of coincidence U is given by $$U = \sum_i |a(i) - b(i)|^P$$

where a(i) is an output from an i-th photo-electric conversion device of said first sensing means, b(i) is an output from an i-th photo-electric conversion device of said second sensing means, and P is a positive number.

12. A focus detection method according to claim 10 wherein first and second sensing means used in said sensing ste each including a plurality of photo-electric conversion devices, and the degree of coincidence U is given by $$U = \sum_i \max\{a(i),b(i)\} - \sum_i \min\{a(i),b(i)\}$$

where a(i) is an output from an i-th photo-electric conversion device of said first sensing means, b(i) is an output from an i-th photo-electric conversion device of said second sensing means, min{x, y} represents a smaller one of two real numbers x and y, and max{x, y} represents a larger one of the two real numbers x and y.

13. A focus detection method according to claim 10 wherein the outputs of said first and second sensing means are divided into a plurality of partially overlapping areas for each of said first and second images.

14. A method for detecting a focus state of an object lens, comprising the steps of:

forming first and second light distributions corresponding to first and second images having light fluxes passing through different object lens wherein the positional relationship between said first and second light distributions varies with the focus state of said object lens;

sensing said first and second images, respectively; and processing output signals obtained in said sensing step to detect the focus state of said object lens;

said signal processing step processing the signal obtained in said sensing step in accordance with a predetermined formula to determine a degree of coincidence of the two image, and when the degree of coincidence is larger than a predetermined value, dividing the outputs obtained in said sensing step into a plurality of areas for each of said first and second images, determining a value representing the positional relationship of said two light distributions corresponding to said first and second images for each area, and detecting the focus based on said values.

15. A focus detection method according to claim 14 wherein first and second sensing means used in said sensing step each including a plurality of photo-electric conversion devices, and the degree of coincidence U is given by $$U = \sum_i |a(i) - b(i)|^P$$

where a(i) is an output from an i-th photo-electric conversion device of said first sensing means, b(i) is an output from an i-th photo-electric conversion device of said second sensing means, and P is a positive number.

16. A focus detection method according to claim 14 wherein first and second sensing means used in said sensing step each including a plurality of photo-electric conversion devices, and the degree of coincidence U is given by $$U = \sum_i \max\{a(i),b(i)\} - \sum_i \min\{a(i),b(i)\}$$

where a(i) is an output from an i-th photo-electric conversion device of said first sensing means, b(i) is an output from an i-th photo-electric conversion device of said second sensing means, min{x, y} represents a smaller one of two real numbers x and y, and max{x, y} represents a larger one of the two real numbers x and y.

17. A focus detection method according to claim 14 wherein the outputs of said first and second sensing means are divided into a plurality of partially overlapping areas for each of said first and second images.

18. A focus detection system for detecting a focus state of an object lens, comprising:
  optical means for forming first and second light distributions respectively corresponding to first and second images having light reflective fluxes passing through the different parts of the object lens, whereby the positional relationship between said first and second light distributions varies in accordance with the focus state of the object lens;
  first and second sensing means for sensing said first and second light distributions, said first and second sensing means each having a plurality of sensor elements; and
  signal processing means for processing output signals from said first and second sensing means to detect the focus state of the object lens in accordance with the positional relationship between the two light distributions, said signal processing means performing a correlational calculation by using the signals from said each of said plurality of sensor elements and evaluating said signals in accordance with a predetermined conditional formula, said signal processing means adopting the result of the correlational calculation when the evaluation satisfies the conditional formula and, when the evaluation does not satisfy the conditional formula, performing another correlational calculation to adopt the result as information of the focus adjusting condition on the basis of signals from continuous sensor elements the number of which is smaller than the number of elements in each of said plurality of sensor elements and which correspond with each other in the positional relationship thereof.

19. A focus detection system for detecting a focus state of an object lens, comprising:
  optical means for forming first and second light distributions respectively corresponding to first and second images having light reflective fluxes passing through the different parts of the object lens, whereby the positional relationship between said first and second light distributions varies in accordance with the focus state of the object lens;
  first and second sensing means for sensing said first and second light distributions said first and second sensing means respectively including a sensing area constituted by a plurality of sensor elements and including a plurality of sensing sub-areas, said sub-areas being narrower than said sensing area and not overlapping each other; and
  signal processing means for performing a first correlational calculation on the basis of the signals from the sensor elements in said sensing area and for performing a second correlational calculation on the basis of the signals from the sensor elements in said sub-areas, said second correlational calculation being executed when an evaluation of the signals from sensing area does not satisfy a predetermined condition.

20. A focus detection system according to claim 19, wherein of said sub-areas is previously selected and the second correlational calculation on the basis of the selected sub-area is adopted as a result.

21. A focus detection system according to claim 19, wherein one of the second correlation calculation results on the basis of said sub-areas is adopted by evaluating the results.

* * * * *

UNITED STATES PATENT AND TRADEMARK OFFICE
CERTIFICATE OF CORRECTION

PATENT NO. : 4,914,282

DATED : April 3, 1990

INVENTOR(S) : Akashi, et al.

It is certified that error appears in the above-identified patent and that said Letters Patent is hereby corrected as shown below:

TITLE PAGE,
AT [57]:

Change "pupila" to read --pupil--; and

Change "detect" to read --detects--.

COLUMN 2:

Line 17, change "curved" to read --curve--;

Line 27, change "curved" to read --curve--;

Line 31, change "curve" to read --curves--;

Line 37, change "curves" to read --curve--;

Line 41, change "curve" to read --curves--; and

Line 42, change "$V_{2(m)}$" to read --$V_2(m)$ curves--.

COLUMN 4:

Line 31, change "$V_I(m)$" to read --$V(m)$--;

Line 37, change "area R" to read --area $R_1$--; and

Line 38, change "of" to read --of the two images in the area $R_1$, and since the area III--.

UNITED STATES PATENT AND TRADEMARK OFFICE
CERTIFICATE OF CORRECTION

PATENT NO. 4,914,282

DATED : April 3, 1990

INVENTOR(S) : Akashi, et al.

It is certified that error appears in the above-identified patent and that said Letters Patent is hereby corrected as shown below:

COLUMN 5:

Line 34, after "clock" insert --pulse--.

COLUMN 7:

Line 23, delete "to select"; and

Line 44, change "m" to read --$m_o$--.

COLUMN 8:

Line 17, change "{$V_{1I}(m)$," to read --{$V_{1I}(m)$,--; and change "$V_{2III}(m)$}. Since" to read --$V_{2II}(m)$, $V_{2III}(m)$}--;

Line 50, change "N data" to read --N/2 data--.

COLUMN 9:

Line 3, change "$M_0 > e_1$," to read "$|m_o| > e_i$,--; and

Line 18, change "$V_{2III}(m')$. (S12)" to read

--$V_{2III}(m')$.
        (S12)-- ((S12) should begin another paragraph).--

UNITED STATES PATENT AND TRADEMARK OFFICE
CERTIFICATE OF CORRECTION

PATENT NO. : 4,914,282

DATED : April 3, 1990

INVENTOR(S) : Akashi, et al.

It is certified that error appears in the above-identified patent and that said Letters Patent is hereby corrected as shown below:

COLUMN 10:

Line 44, change "as" to read --an--;

Line 45, change "min" to read --min{x,y}--;

Line 46, change "max" to read --max{x,y} represents a larger one of the two real numbers x and y.--; and Line 51, delete in its entirety.

COLUMN 11:

Line 17, change "determining" to read --detecting--;

Line 58, change "steps" to read --step--;

Line 62, change "is" to read --in--; and

Line 65, change "steps" to read --step--.

COLUMN 12:

Line 5, change "photoelectric" to read --photo-electric--;

Line 17, change "ste" to read --step--;

UNITED STATES PATENT AND TRADEMARK OFFICE
CERTIFICATE OF CORRECTION

PATENT NO. : 4,914,282

DATED : April 3, 1990

INVENTOR(S) : Akashi, et al.

It is certified that error appears in the above-identified patent and that said Letters Patent is hereby corrected as shown below:

COLUMN 12:

Line 37, change "different object" to read --different parts of a pupil of an object--;

Line 38, change "said" to read --the--;

Line 44, change "signal" (second occurrence) to read --signals--;

Line 47, change "image," to read --images,--; and

Line 52, change "said two light" to read --said light--.

COLUMN 14:

Line 19, change "distributions" to read --distributions,--;

Line 33, change "sensing area" to read --said sensing area--; and

Line 36, change "of" to read --one of--.

Signed and Sealed this

Ninth Day of June, 1992

Attest:

DOUGLAS B. COMER

*Attesting Officer*     *Acting Commissioner of Patents and Trademarks*